United States Patent [19]
Valencia

[11] Patent Number: 5,185,861
[45] Date of Patent: Feb. 9, 1993

[54] CACHE AFFINITY SCHEDULER

[75] Inventor: Andrew J. Valencia, Portland, Oreg.

[73] Assignee: Sequent Computer Systems, Inc., Beaverton, Oreg.

[21] Appl. No.: 747,658

[22] Filed: Aug. 19, 1991

[51] Int. Cl.$^5$ .................. G06F 12/00; G06F 15/16
[52] U.S. Cl. .................... 395/200; 395/325; 395/775; 395/425
[58] Field of Search ............ 364/DIG. 1, 243, 243.4, 364/243.41, 243.42, 243.44, 228.3, 228.1, 230, 229, 238.4, 240; 395/425, 400, 775, 275, 650, 200, 164, 166, 325

[56] References Cited

U.S. PATENT DOCUMENTS

| | | | |
|---|---|---|---|
| 3,848,234 | 11/1974 | MacDonald | 395/425 |
| 4,414,624 | 11/1983 | Summer et al. | 395/650 |
| 4,638,427 | 1/1987 | Martin | 395/500 |
| 4,695,951 | 9/1987 | Hooker | 364/200 |

OTHER PUBLICATIONS

S. Curran & M. Stumm, "A Comparison of Basic CPU Scheduling Algorithms for Multiprocessor UNIX," Computing Systems, vol. 3, No. 4, Fall 1990.
Symmetry Series Computers manufactured by Sequent Computing Systems as described on pp. 1-9 of the present application.

Primary Examiner—Robert L. Richardson
Attorney, Agent, or Firm—Stoel Rives Boley Jones & Grey

[57] ABSTRACT

A computing system (50) includes N number of symmetrical computing engines having N number of cache memories joined by a system bus (12). The computing system includes a global run queue (54), an FPA global run queue, and N number of affinity run queues (58). Each engine is associated with one affinity run queue, which includes multiple slots. When a process first becomes runnable, it is typically attached one of the global run queues. A scheduler allocates engines to processes and schedules the processes to run on the basis of priority and engine availability. An engine typically stops running a process before it is complete. When the process becomes runnable again the scheduler estimates the remaining cache context for the process in the cache of the engine. The scheduler uses the estimated amount of cache context in deciding in which run queue a process is to be enqueued. The process is enqueued to the affinity run queue of the engine when the estimated cache context of the process is sufficiently high, and is enqueued onto the global run queue when the cache context is sufficiently low. The procedure increases computing system performance and reduces bus traffic because processes will run on engines having sufficient cache affinity, but will also run on the best available engine when there is insufficient cache context.

25 Claims, 8 Drawing Sheets

CACHE AFFINITY SCHEDULER

TECHNICAL FIELD

This invention relates to scheduling of processes that run on computing engines in a multiprocessor computing system and, in particular, to a scheduler that considers erosion of cache memory context when deciding in which run queue to enqueue a process.

BACKGROUND OF THE INVENTION

FIG. 1 is a block diagram of major subsystems of a prior art symmetrical multi-processor computing system 10. Examples of system 10 are models S27 and S81 of the Symmetry Series manufactured by Sequent Computing Systems, Inc., of Beaverton, Oregon, the assignee of the present patent application. The Symmetry Series models employ a UNIX operating system with software written in the C programming language. The UNIX operating system, which is well known to those skilled in the art, is discussed in M. Bach, *The Design of the UNIX Operating System,* Prentice Hall, 1986. The C programing language, which is also well known to those skilled in the art, is described in B. Kernighan and D. Ritchie, *The C Programming Language,* 2d Ed., Prentice Hall, 1988.

Referring to FIG. 1, system 10 includes N number of computing engines denominated engine $1_p$, engine $2_p$, engine $3_p$, . . . , engine $N_p$ (collectively "engines $1_p$-$N_p$"). Each one of engines $1_p$-$N_p$ is a hardware computer which includes a microprocessor such as an Intel 386 and associated circuitry. System 10 is called a symmetrical multi-processor computing system because each one of engines $1_p$-$N_p$ has equal control over system 10 as a whole.

Each one of engines $1_p$-$N_p$ has a local cache memory denominated cache $1_p$, cache $2_p$, cache $3_p$, . . . , cache $N_p$, respectively (collectively "caches $1_p$-$N_p$"). The purpose of a cache memory is to provide high-speed access and storage of data associated with processes performed by an engine. A system bus $12_p$ joins engines $1_p$-$N_p$ to a main RAM memory $14_p$ of system 10. Data stored in one of cache memories $1_p$-$N_p$ can originate from the corresponding engine, the cache memory of another engine, a main memory $14_p$, a hard disk controlled by a disk controller 18, or an external source such as terminals through a communications controller 20.

Cache memories $1_p$-$N_p$ are each organized as a pseudo least-recently-used (LRU) set associative memory. As new data are stored in one of the cache memories, previously stored data are pushed down the cache memory until the data are pushed out of the cache memory and lost. Of course, the data can be copied to main memory 14 or another cache memory before the data are pushed out of the cache memory. The cache context of a process with respect to an engine "erodes" as data associated with a process is pushed out of the cache memory of the engine.

A scheduler determines which engine will run a process, with a highest priority process running first. On a multi-processor system, the concept of priority is extended to run the highest n number of priority processes on the m number of engines available, where m =n unless some of the engines are idle. In system 10, the scheduler is a software function carried on by the UNIX operating system that allocates engines to processes and schedules them to run on the bases of priority and engine availability. The scheduler uses three distinct data structures to schedule processes: (1) a global run queue 4 (FIG. 2), (2) a floating point accelerator (FPA) global run queue, and (3) an engine affinity run queue 38 (FIG. 3) for each engine. The FPA global run queue is the same as global run queue 34 except that the FPA global run queue may queue processes requiring FPA hardware.

FIG. 2 illustrates the prior art global run queue 34 used by system 10. Referring to FIG. 2, global run queue 34 includes an array qs and a bit mask whichqs. Array qs is comprised of 32 pairs (slots) of 32-bit words, each of which points to one linked list. The organization of the processes is defined by data structures. Each slot includes a ph_link field and a ph_rlink field, which contain address pointers to the first address of the first process and the last address of the last process, respectively, in a double circularly linked list of queued processes. The 32 slots are arranged in priority from 0 to 31, as listed at the left side of FIG. 2, with priority 0 being the highest priority.

The bit mask whichqs indicates which slots in the array qs contain processes. When a slot in qs contains a process, whichqs for that slot contains a "1". Otherwise, the whichqs for that slot contains a "0". When an engine looks for a process to run, the engine finds the highest priority whichqs bit that contains a 1, and dequeues (i.e., detaches) a process from the corresponding slot in qs.

FIG. 3 illustrates the affinity run queue 38 used by system 10. Under default condition, after a process becomes runnable, it is enqueued (i.e., joined) to either global run queue 34 or the FPA global run queue, rather than to an affinity run queue 38. However, a process may be "hard affinitied" to run only on a particular engine. In that case, the process is enqueued only to the affinity queue 38 for that engine (rather than a global run queue) until the hard affinity condition is ended. Of course, there are times, for example, when it is asleep, when a hard affinitied process is not queued to any run queue.

Referring to FIG. 3, each one of engines $1_p$-$N_p$ is associated with its own affinity run queue 38. Each affinity run queue 38 has an e_head field and an e_tail data structure, which contain the address pointers to the first and last address, respectively, of the first and last processes in a doubly circularly linked list of affinitied processes. When a process is hard affinitied to an engine, it is enqueued in FIFO manner to the double circularly linked list of the affinity run queue 38 that corresponds to the engine. The FIFO arrangement of each linked list is illustrated in FIG. 3. Each of the linked lists of the slots of global run queue 34, shown in FIG. 2, has the same arrangement as the linked list shown in FIG. 3.

Affinity run queue 38 differs from global run queue 34 in the following respects. First, global run queue 34 has 32 slots and can, therefore, accommodate 32 linked lists. By contrast, each affinity run queue 38 has only one slot and one linked list. Second, as a consequence of each affinity run queue 38 having only one linked list, the particular engine corresponding to the affinity run queue 38 is limited to taking only the process at the head of the linked list, even though there may be processes having higher priority in the interior of linked list. Third, the linked list of processes must be emptied before the engine can look to a global run queue for additional processes to run. Accordingly, affinity run queue 38 does not have a priority structure and runs processes in round robin fashion. Fourth, as noted above, only hard affinitied processes are enqueued to affinity queue 38.

Because of the non-dynamic and explicitly-invoked nature of hard affinity, it is used mostly for performance analysis and construction of dedicated system configurations. Hard affinity is not used in many customer configurations because the inflexibility of hard affinity does not map well to the complexity of many realworld applications.

The lifetime of a process can be divided into several states including: (1) the process is "runnable," (i.e., the process is not running, but is ready to run after the scheduler chooses the process), (2) the process is executing (i.e., running) on an engine, and (3) the process is sleeping. The second and third states are well known to those skilled in the art and will not be described herein in detail.

When a process is runnable, the scheduler first checks to see whether the process is hard affinitied to an engine. If the process is hard affinitied, it is enqueued onto the FIFO linked list of the affinity run queue 38 associated with the engine.

If the process is not hard affinitied to an engine and is not marked for FPA hardware, then the process is queued on one of the linked lists of qs in global run queue 34 according to the priority of the process. The appropriate bit in whichqs is updated, if necessary. If the process is not affinitied, but has marked itself as requiring FPA hardware, the process is queued to one of the linked lists of fpa_qs in the FPA global run queue, and the appropriate bit in fpa_whichqs is updated, if necessary, where fpa_qs and fpa_whichqs are analogous to qs and whichqs.

When an engine is looking for a process to run, the engine first examines its affinity run queue 38. If affinity run queue 38 contains a process, the first process of the linked list is dequeued and run. If affinity run queue 38 for a particular engine is empty, then the scheduler examines whichqs of global run queue 34 and fpa_whichqs of the global FPA run queue to see whether processes are queued and at what priorities. The process having the higher priority runs first. If the highest priorities in whichqs of global run queue 34 and fpa_whichqs in the FPA global run queue are equal, the process in the FPA format runs first.

A goal of system 10 is to achieve a linearly increasing level of "performance" (i.e., information processing capacity per unit of time), as engines and disk drives are added. An obstacle to meeting that goal occurs when there is insufficient bus bandwidth (bytes per unit time period) to allow data transfers to freely flow between subsystem elements. One solution would be to increase the bandwidth in system bus $12_{12}$. However, the bandwidth of system bus $12_p$ is constrained by physical cabinet and connector specifications.

The problem of inadequate bandwidth is exacerbated because system 10 allows customers to add additional disk drives and engines to increase the value of the number $N_p$ after the system is in the field. In addition, in system 10, engines $1_p$-$N_p$ and the disk drives may be replaced with higher performance engines and disk drives. Increased engine performance increases the number of instructions processed per operating system time slice. This in turn requires larger cache memories on the processor boards in an effort to reduce memory-to-processor traffic on the main system bus. However, cache-to-cache bus traffic increases along with the cache memory size thereby frustrating that effort. Likewise, adding multiple disk drives increases the requirement for disk I/O bandwidth and capacity on the bus.

When a process moves from a previous engine to a new engine, there is some cost associated with the transition. Streams of cache data move from one engine to another, and some data are copied from main memory 14. Certain traffic loads, database traffic loads in particular, may result in a bus saturation that degrades overall system performance. Data are transferred over system bus $12_p$ as data are switched from main memory $14_p$ or the previous cache memory to the new engine and the new cache memory. However, each time a process runs from the global run queue, the odds that the process will run on the same engine as before approaches 1/m, where m is the number of active on-line engines. On a large system, m is usually 20 or more, giving less than a 5% chance that the process will run on the same engine as before. However, it is difficult to accurately characterize the behavior of an operating system. The actual odds will, of course, depend on CPU and I/0 load and the characteristics of the jobs running.

In many situations, it is desirable for an engine to stop running an unfinished process and perform another task. For example, while an engine is running one process, a higher priority process may become runnable. The scheduler accommodates this situation through a technique called "nudging." A nudge is a processor-to-processor interrupt that causes a destination processor to re-examine its condition and react accordingly. In the case of a higher priority process, the "nudged" destination engine will receive the interrupt, re-enter the operating system, notice that there is higher priority work waiting, and switch to that work. Each nudge has a corresponding priority value indicating the priority of the event to which the engine responds. As an optimization, the priority of the nudge pending against an engine is recorded per engine. When nudge is called for priority less than or equal to the value already pending on the engine, the redundant nudge is suppressed.

When a process becomes runnable, the scheduler scans engines $1_p$-$N_p$ for the engine(s) running the lowest priority process(es). If the newly runnable process has an equal or greater priority than the presently running processes, the engine (or one of the engines) with the highest priority (e.g., engine $1_p$) is "nudged" to reschedule in favor of the newly runnable process. Consequently, a process (e.g., process X) ceases to run on engine $1_p$, at least temporarily. During the time other processes are running on engine $1_p$, the cache context for process X erodes.

Two problems with the prior art scheduler are illustrated by considering what happens when process X (in the example above) becomes runnable. First, if process X is not hard affinitied, it is enqueued to a global run queue. However, as noted above, there is only approximately a 1/m chance that process X will next run on engine $1_p$. Therefore, even though the cache context for process X may be very high in cache $1_p$ of engine $1_p$, process X will probably be run on another engine. If process X is run on another engine, some of the capability of system 10 will be used in moving data over system bus $12_p$. As data is moved over system bus $12_p$ to the other engine, system performance may be reduced.

Second, if process X is hard affinitied, it will be enqueued onto affinity run queue 38 of engine $1_p$, regardless of how many other processes are enqueued onto affinity run queue 38 of engine $1_p$ and regardless of whether other engines are idle. Therefore, system performance may be reduced because of idle engines.

Thus, the prior art scheduler poorly reuses cache memory unless the flexibility of symmetrical multiprocessing is given up by using hard affinity. Therefore, there is a need for a scheduler that causes a runnable process to be enqueued onto the affinity run queue of an engine when the cache context (or warmth) of the process with respect to the engine is sufficiently high, and to be enqueued onto a global run queue when the cache context is sufficiently low. Additionally, periodic CPU load balancing calculations (schedcpu()) could be improved to maintain a longer-term view of engine load and to cause redistribution of processes if a significant excess of processes exists at any particular engine. Further, such redistribution of processes could consider the priority of the processes to be moved.

SUMMARY OF THE INVENTION

An object of the present invention is to provide a linear performance increase as engines having higher performance microprocessors and larger cache memories are added to a system.

Another object of the invention is to provide a scheduler that enqueues processes to either an affinity run queue or a global run queue so as to, on average, maximize performance of a multi-processor computing system.

A further object of the invention is to optimize the assignment of processes to engines in an attempt to minimize engine-to-engine movement of processes and their related cache memory context.

Still another object of the invention is to increase the effective bus bandwidth in a multi-processor computing system by reducing the amount of unnecessary bus traffic.

This invention satisfies the above objects by implementing data structures and algorithms that improve the process allocating efficiency of the process scheduler by reducing cache-to-cache traffic on the bus and thereby improve the overall computing system performance. The scheduler uses the concept of cache context whereby a runnable process is enqueued onto the affinity run queue of an engine when the estimated cache context of the process with respect to the engine is sufficiently high, and is enqueued onto a global run queue when the estimated cache context is sufficiently low. A premise underlying the operation of the present invention is that it is often more efficient to wait for a busy engine where cache context already exists than to move to a waiting engine where cache context will need to be transferred or rebuilt.

Additional objects and advantages of this invention will be apparent from the following detailed description of a preferred embodiment thereof which proceeds with reference to the accompanying drawings.

DETAILED DESCRIPTION OF PREFERRED EMBODIMENT HARDWARE

Figure 4:
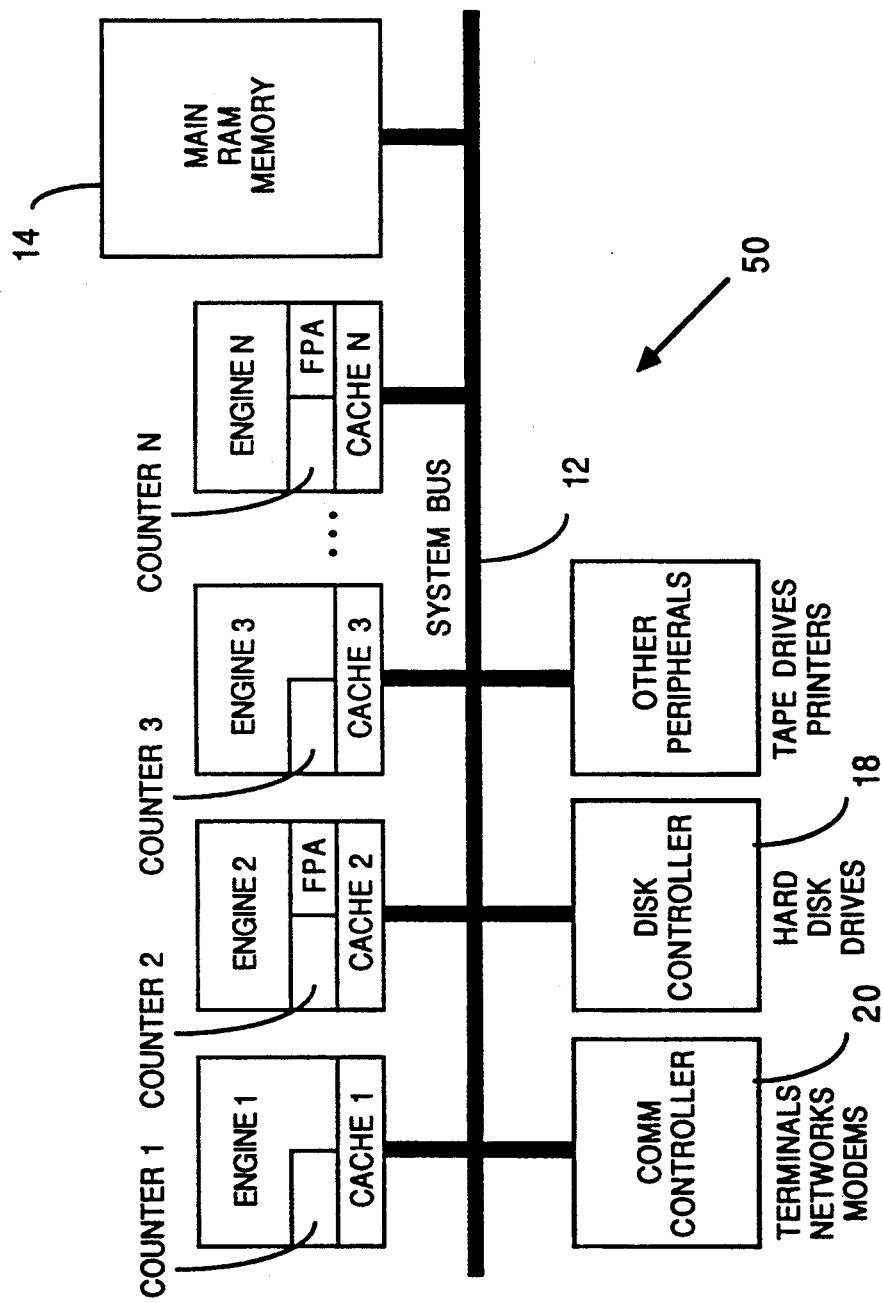
FIG. 4 is a block diagram of the major subsystems of a symmetrical multi-processor computing system operating in accordance with the present invention.

A preferred embodiment of the present invention is implemented in a symmetrical multi-processor computing system 50, shown in FIG. 4. Referring to FIG. 4, system 50 includes N number of computing engines denominated engine 1, engine 2, engine 3, ..., engines N (collectively "engines 1-N"). Each one of engines 1-N has a local cache memory denominated cache 1, cache 2, cache 3, ..., cache N, respectively ("collectively caches 1-N"), each of which is organized as a pseudo LRU FIFO, described above. The hardware of system 50 may be identical to the hardware of prior art system 10, with the only changes being software additions and modifications. Alternatively, in addition to the changes in software, one or more of engines 1-N may be different from the engines of engines $1_p$-$N_p$. Caches 1-N and main memory 14 may have different capacities from those of caches $1_p$-$N_p$ and main memory $14_p$, respectively. System bus 12 may have a different number of conductors from those of system bus $12_p$. Additional potential modifications and additions to system 10 are described below.

Overview of data structures

In prior art system 10, each run queue a process could be scheduled from had a discrete data structure. Global run queue 34 included whichqs and qs. FPA global run queue included whichqs_fpa and qs_fpa. Each engine's affinity run queue included e_head and e_tail.

By contrast, in the preferred embodiment, a single data structure, struct runq, is used instead. Where prior art system 10 treated each kind of scheduling data structure with special-case code, the preferred embodiment applies the same code, changing only which instance of struct runq it is operating upon.

As used herein, "cache context" is a measure of how much of the data associated with a process is in a cache memory. When the data is initially copied from main memory 14 to a cache memory, the cache context of the cache memory with respect to the process is high (in fact, 100%). The cache context of the cache memory with respect to the process decreases or "erodes" as data in the cache are pushed out of the cache memory as data not associated with the process are added to the cache memory. A cache memory is "warm" if the estimated amount cache context is above a certain level. A cache memory is "cold" if the estimated amount of cache context is below a certain level. A process has "cache affinity" with respect to an engine if a pointer (*p—rq) of the process points to the affinity run queue, described below, of the engine.

Figure 3:
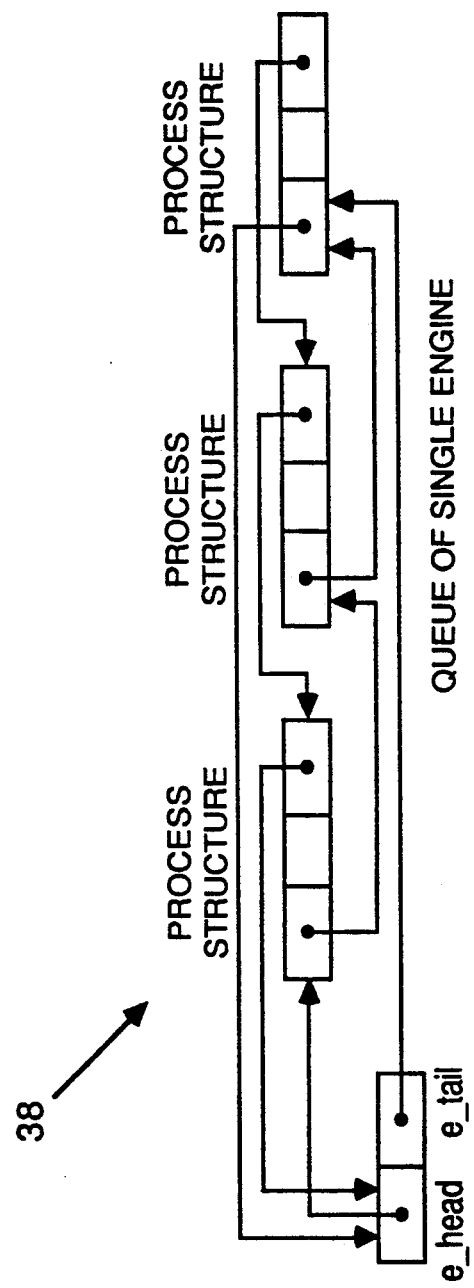
FIG. 3 is a schematic diagram of a prior art engine affinity run queue.
Figure 5A:
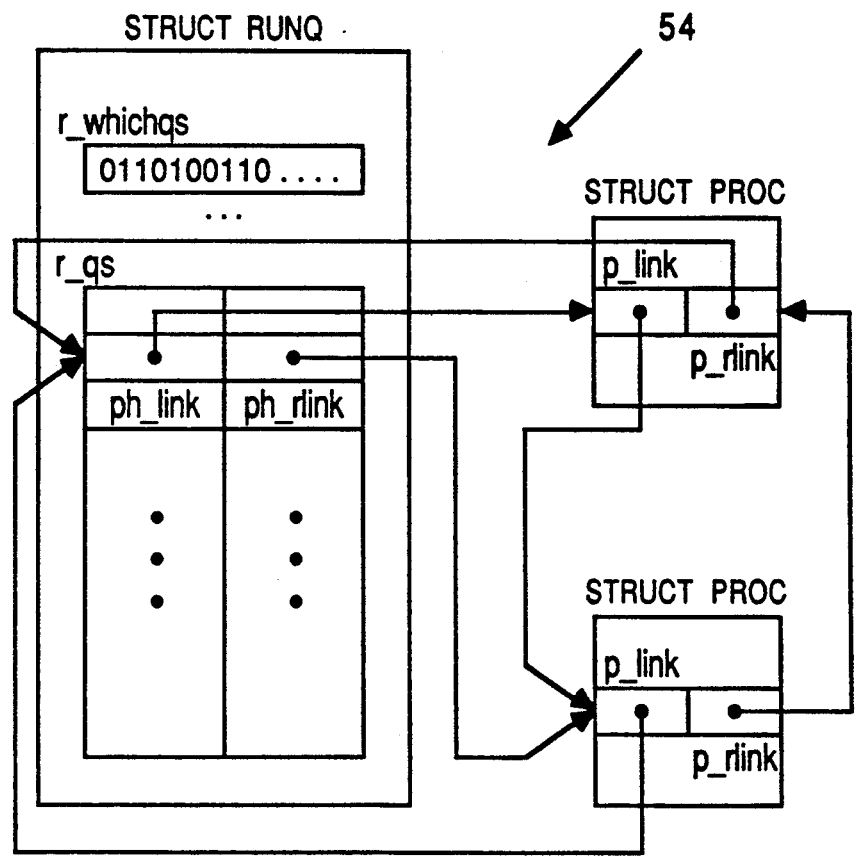
FIG. 5A is a schematic diagram of a global run queue and according to the present invention.
Figure 5B:
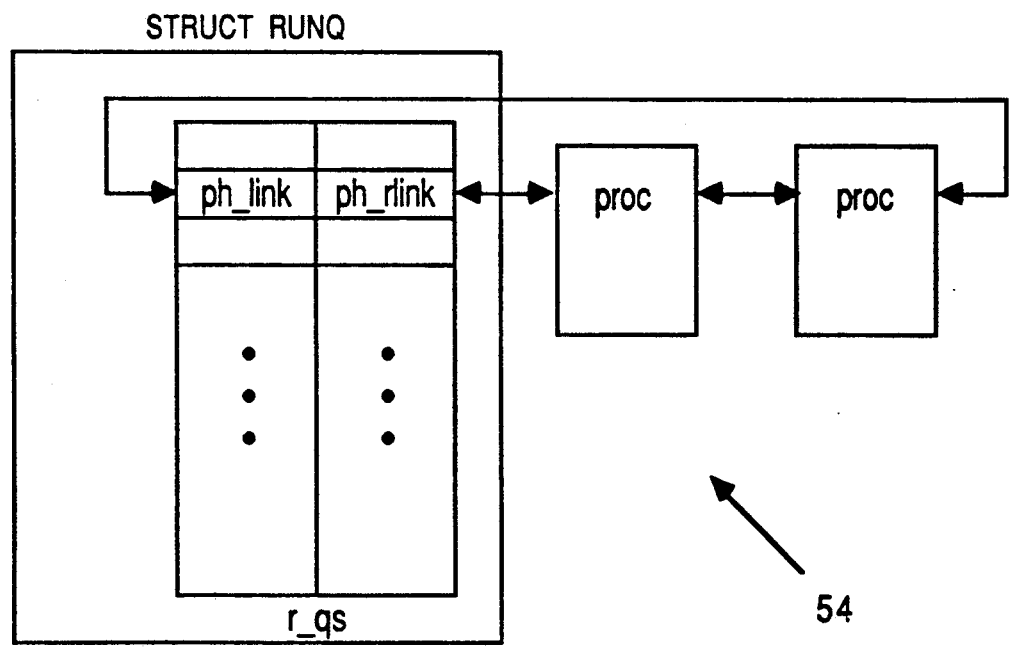
FIG. 5B is a simplified version of the diagram of FIG. 5A.
Figure 6:
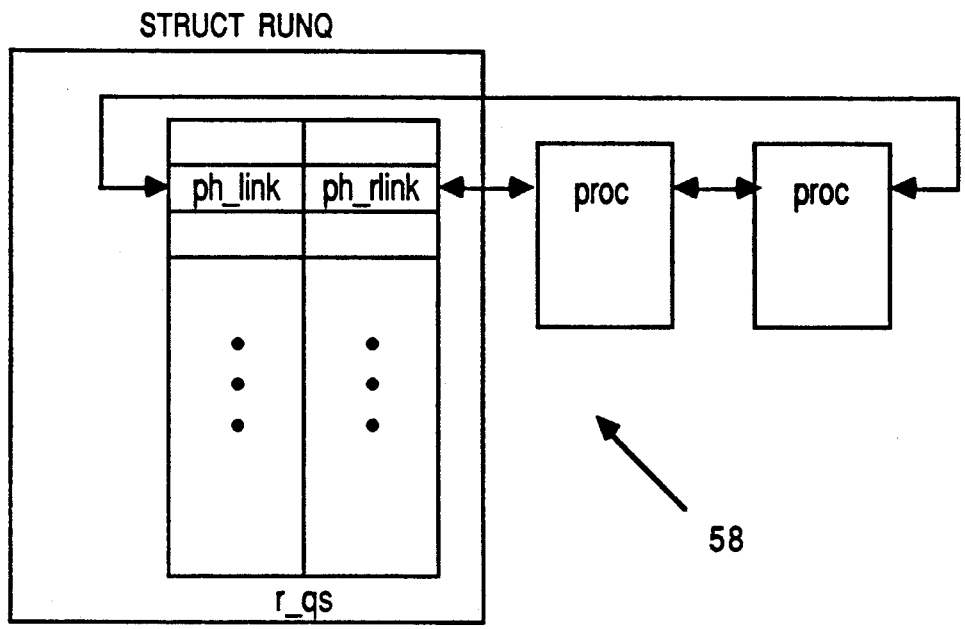
FIG. 6 is a schematic diagram of an affinity run queue according to the present invention.

System 50 includes at least one global run queue, such as global run queue 54 shown in FIGS. 5A and 5B, and an affinity run queue 58 shown in FIG. 6 for each engine 1-N. Global run queue 54 and affinity run queue 58 are examples of the "struct runq" data structure, described below. FIG. 5B is a simplified version of FIG. 5A. The structures of global run queue 54 and affinity run queue 58 are similar to the structure of global run queue 34 in that they may queue processes in different linked lists, according to priority. Each linked list in the multiple slots of global run queue 54 and affinity run queue 58 has the same structure as that of the linked list in the single slot of prior art affinity run queue 34, shown in FIG. 3.

Although each run queue has the same data structure as that of global run queue 54, particular types of processes may be queued to only a certain type of run queue. For example, a first group of engines 1-N could contain Intel 386 microprocessors, a second group of engines 1-N could include Intel 486 microprocessors, and a third group of engines 1-N could contain FPA-equipped Intel 386 microprocessors. In this example, each engine would point to its own affinity run queue 58. In addition, the first group of engines 1-N would point to global run queue 54. The second group of engines 1-N would point to a 486 type global run queue. The third group of engines 1-N would point to an FPA global run queue. System 50 could include additional types of global run queues including global run queues for engines having an expanded instruction set, a reduced instruction set, on-chip cache, or other properties. In the case of an engine with a microprocessor with on-chip cache, the present invention preferably would optimize the use of both on-chip and on-board cache.

In some circumstances, a process may be enqueued at different times to more than one type of global run queue. For example, a process that is compatible with the Intel 386 format may be able to run on both an Intel 386 and an FPA engine. In that case, depending on the demands on the different types of engines, the process could be enqueued to either global run queue 54 or the FPA global run queue.

The scheduler according to the present invention comprises the conventional UNIX scheduler to which is added the new and changed data structures and algorithms described herein.

When a process becomes runnable, the scheduler selects the run queue to which the process is to be enqueued. System 50 may use any conventional means to enqueue a process to a run queue. The scheduler selects the run queue by considering an estimation of how much cache context (if any) the process has with respect to the cache of an engine. The estimation of cache context with respect to a process is based on the number of user (as opposed to kernel) process clock ticks an engine has executed since the last time it ran the process.

The process clock ticks are produced by a clock routine, named hardclock. The hardclock routine is entered for each engine one hundred times a second. If the routine is entered during a time when a particular engine is running a user process, then a 32-bit counter associated with the particular engine is incremented. Engines 1-N include counters 1-N, respectively, shown in FIG. 4. For example, counter 2 is included with engine 2. The functions of hardclock and counters 1-N may be performed either by existing hardware in prior art system 10 with additional software, or by additional hardware and software.

As each process leaves an engine, a pointer (*p—runeng) that points to the engine is stored. The value (p—runtime) of the counter of the engine is also stored. For example, at time $t_1$, process X leaves engine 2. Accordingly, *p—runeng=engine 2 and the count (p—runtime) of counter 2 at time $t_1$ are stored. At time $t_2$, the process becomes runnable again. At time $t_3$, the scheduler calculates the difference ($D_{e-p}$) between the stored p—runtime and the count (e—runtime) of counter 2 at time $t_.$ $D_{e-p}$ is inversely related to the probable amount of cache context remaining. The scheduler uses $D_{e-p}$ in estimating how much cache context remains for the process with respect to the engine.

An engine is pointed to by and can run processes from two or more run queues. In the examples described herein, system 50 employs three types of run queues, each having the identical data structure: a global UNIX run queue 54, an FPA global run queue, and one affinity run queue 58 for each engine. When an engine is activated, it is pointed to by a list of the appropriate run queues. Processes are generally initially attached to the global run queue, and may be moved to other run queues as described below.

Conceptually, a process does not choose to run on a particular engine; instead, a process is enqueued to a run queue, and then is run by an engine that is a member of an engine list pointed to by the run queue. If the engine list contains only a single engine, the run queue is an affinity run queue and the process is affinitied to the engine. If the engine list contains only FPA-equipped engines, the run queue is an FPA run queue and the process has FPA affinity. A global run queue points at an engine list that contains all of the engines on the system that will run processes of the type queued to the global run queue.

Each process has a data structure that has two pointers to run queues: a current run queue pointer (*p—rq) and a home run queue pointer (*p—rqhome). The current first pointer indicates the run queue to which the process is enqueued when it becomes runnable. The home run queue pointer indicates the home run queue of the process. When a process is first created, both pointers generally point to a global run queue. (The home run queue may be an affinity run queue if the process is hard affinitied to an affinity run queue.) However, when a process is moved to an affinity run queue (because of sufficient cache context), the current run queue pointer is moved, but the home pointer is unchanged. If the process needs to move from its current run queue (because of insufficient cache context or the engine is shutting down), the current run queue pointer of the process is moved back so that the current run queue pointer points to the home run queue. For an FPA process, the home run queue pointer points to an FPA global run queue. This allows the scheduler to apply cache affinity to more than one global scheduling pool of processes, without the need for consideration of special cases.

The following sequence of operations is exemplary of the handling of processes by the cache affinity scheduler of the present invention. When a process is first created, it is attached to its current run queue which is generally the global run queue. If the process has a higher priority than that of the process currently running in any engine that is a member of the engine list for the current run queue, the engine is nudged to decide whether to immediately run the newly enqueued process in place of the running process.

In addition, an engine can become idle and look for a runnable process among any of the run queues that are on the list of run queues for that engine. The engine then selects the highest priority process found, and runs it. Sometime later the process will cease running, at which time the counter value (p_runtime) for the process is stored. Often when a process stops running it enters a sleeping state in which the process waits for another action such as a key stroke prior to becoming runnable again.

When the process subsequently becomes runnable, cache context becomes a consideration in deciding to which run queue the process should be enqueued. The scheduler first examines the p_flag field of the process to determine whether the cache affinity bit (SAFFIN) is set (i.e., =1). If the cache affinity bit is set, the scheduler considers whether the process has cache affinity in deciding in which run queue the process will be enqueued.

The scheduler next inspects the engine on which the process last ran to determine the current counter value for that engine (e_runtime). $D_{e-p} = $ e_runtime $-$ p_runtime is the accumulated clock tick value for other user processes that have run or are running on the engine since the process last ran there. If $D_{e-p}$ is low (e.g., less than 3), the estimated cache context is high. Accordingly, on average, the performance of system 50 will be increased by enqueuing the process to the affinity run queue rather than to a global run queue. In that case, the process switches its current run queue pointer from the process' home run queue to the affinity run queue for that engine. If $D_{e-p}$ is high (e.g. more than 15), the estimated cache context is low and the process is moved back to its home run queue.

Data structure descriptions

The cache affinity scheduler employs a set of data structures and algorithms that handle processes according to the general description given above. Some of the data structures are new, and others are existing data structures for which additional fields have been defined. For existing data structures, the added fields are described. Fields not disturbed in the conventional UNIX data structures are indicated by "..." in the listings. For new data structures, the entire declaration is included.

| 1. Added fields in the process data structure |  |
|---|---|
| struct proc { | |
| ... | |
| struct runq *p_rqhome; | /* home run queue of process */ |
| struct runq *p_rq; | /* current run queue */ |
| ulong p_runtime; | /* eng time when last run */ |
| struct engine *p_runeng; | /* eng the process last ran on */ |
| #define SAFFIN 0x4000000 | /* use affinity in scheduling */ |
| ... | |
| }; | |

The following is an explanation of the added process data structure fields:

*p_rqhome and *p_rq are the home and current run queue pointers. As described below, *p_rq points to the run queue to which the process will enqueue itself. Therefore, if the process chooses to enqueue itself to a different run queue (because of cache affinity considerations or an explicit hard affinity request), the *p_rq field is updated accordingly. *p_rqhome keeps track of the base or home run queue of the process. Absent hard affinity, *p_rqhome points to a particular global run queue, depending on the type of process. For example, if the process is an FPA type process, *p_rqhome for the process points to the FPA global run queue.

p_runtime holds the engine hardclock counter value at the time this process last ran.

*p_runeng is a pointer to the engine this process last ran on.

SAFFIN (cache affinity bit) is a new bit in the existing p_flag field. Cache context will be considered only for processes having this bit set. This bit is inherited through fork(), and all processes initiated from initial startup of the system will have the cache affinity bit set. The bit is cleared when a process hard affinities itself to an engine, as cache affinity is then a moot factor.

| 2. Added fields in the engine data structure |  |
|---|---|
| struct engine { | |
| ... | |
| int e_npri; | /* priority of current process */ |
| struct runql *e_rql; | /* list of run queues to run from */ |
| struct runq *e_rq; | /* affinity run queue of engine */ |
| ulong e_runtime; | /* clock for cache warmth calc */ |
| struct runq *e_pushto; | /* load balancing, where to push */ |
| int e_pushcnt; | /* # processes to push there */ |
| ... | |
| }; | |

The following is an explanation of the added fields in the engine data structure:

e_npri is a field used in the engine data structure of prior art system 10. Although e_npri is not added by the present invention, e_npri is included here because it is discussed below with respect to the timeslice algorithm. e_npri records the priority of a process the engine may be currently running. The scheduler uses e_npri to correct for ties in priority of processes so that processes from certain run queues are not continuously ignored.

e_rql maintains the linked list of the run queues from which this engine schedules.

e_rq indicates the affinity run queue for this engine (i.e., a run queue whose only member is this engine).

e_runtime is the engine counter value that is compared with p_runtime to calculate the amount of cache context (cache warmth) remaining for this engine.

e_pushto identifies the engine to which processes will be moved if process load balancing is required. The algorithms controlling load balancing are described below.

e_pushcnt identifies the number of processes that will be moved to a different engine if load balancing is used.

| 3. Run queue data structure |  |
|---|---|
| /* a place to enqueue a process for running */ | |
| struct runq { | |
| int r_whichqs; | /* bit mask of runq priority levels with waiting processes */ |
| struct prochd r_qs[NQS]; | /* Run queues, one per bit in r_whichqs */ |
| int r_pmembers; | /* # processes belonging to this queue */ |

-continued

3. Run queue data structure

| | |
|---|---|
| int r_emembers; | /* # engs scheduling from this queue */ |
| struct engl *r_engs; | /* a list of those engines */ |
| unsigned r_flags; | /* miscellaneous flags */ |
| struct runq *r_act; | /* a pointer to next active runq */ |
| }; | |

Figure 1:
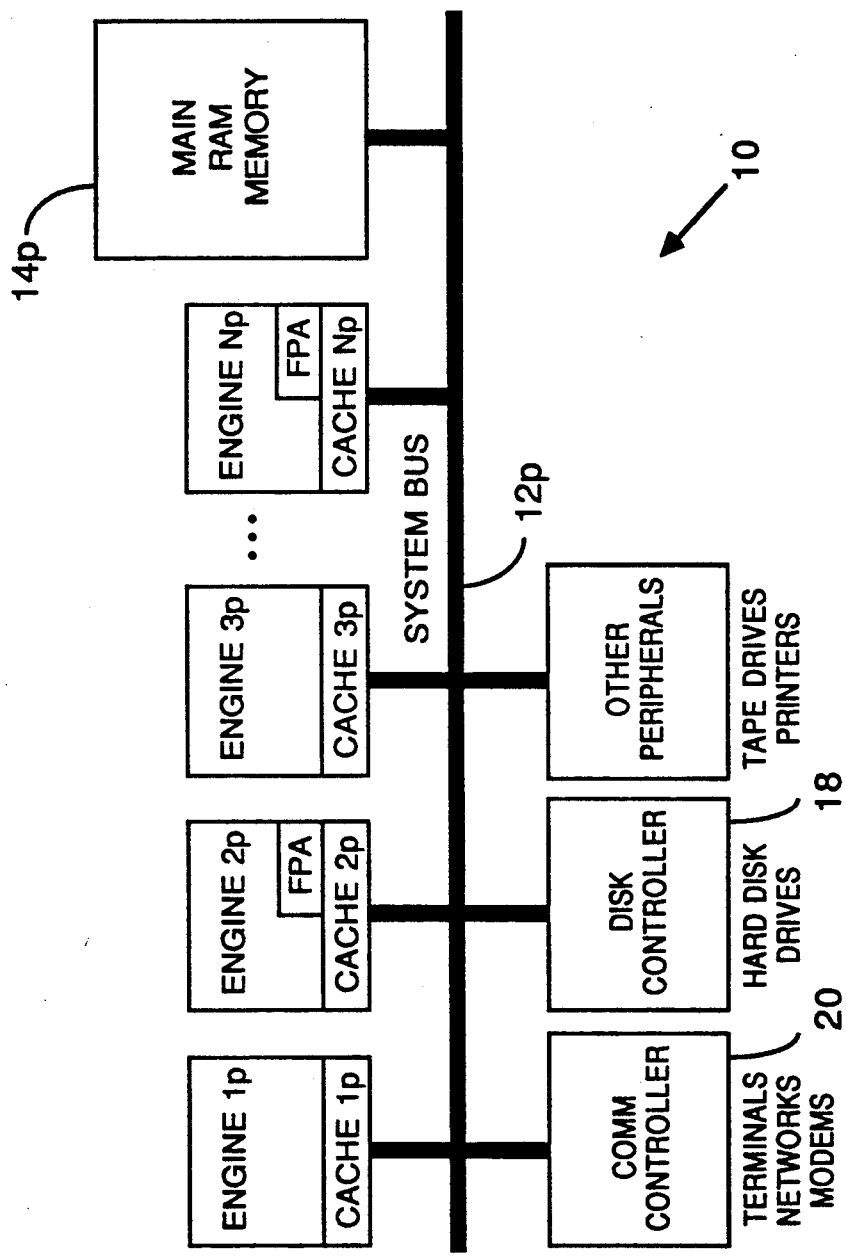
FIG. 1 is a block diagram of the major subsystems of a prior art symmetrical multi-processor computing system.
Figure 2:
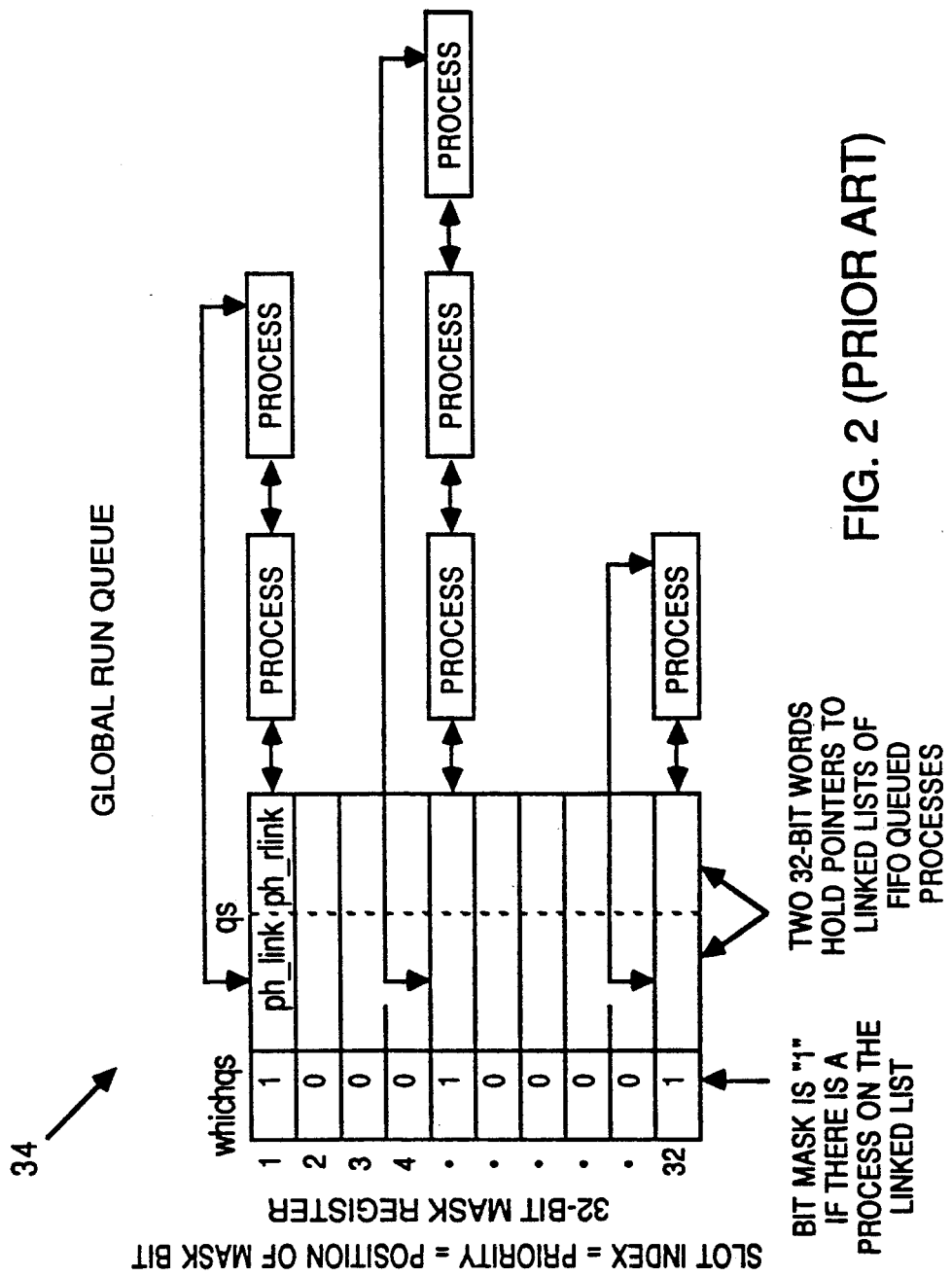
FIG. 2 is a schematic diagram of a prior art global run queue.

The following is an explanation of the run queue data structure fields:

r_whichqs and r_qs correspond to the structures whichqs and qs used in prior art global run queue 34. prochd is the pair of ph_link and ph_rlink (which are described in connection with FIG. 2) for each slot in a run queue according to the present invention. Each bit in r_whichqs corresponds to an index in r_qs[NQS]; the bit is set if there is a process queued in that slot. "NQS" means the "number of queue slots," for example, 32 slots.

r_pmembers and r_emembers count the number of processes and engines, respectively, belonging to this run queue.

*r_engs is a pointer to a linked list of all engines scheduling from this run queue.

r_flags holds miscellaneous flags.

*r_act is a pointer to a singly-linked list of all run queues active on the system. It is used primarily by timeslice() to implement timeslicing priority among processes of equal priority on the system. Timeslicing is discussed below.

4. Runq list and engine list data structures

```
struct runql {
        struct runq *rql_runq;
        struct runql *rql_next;
};
struct engl {
        struct engine *el_eng;
        struct engl *el_next;
};
```

The struct runql and struct engl data structures define circularly linked lists of run queue and engine members. The struct runql statement defines the circular list of run queues to which an engine belongs, and is pointed to from the *e_rql field of the engine data structure. The struct engl statement defines the circular list of engines that belong to a run queue, and is pointed to from the *r_engs field of the run queue data structure. The lists are organized circularly to allow implementation of a conventional round robin scheduling routine. To avoid scheduling inequalities, the scheduling code sets its list pointer (*e_rql for engines; *r_engs for run queues) to the last entry operated upon, and starts looping one entry beyond the last entry. Because the lists are circular, the implementation requires only the assignment of the list pointer.

Figure 7:
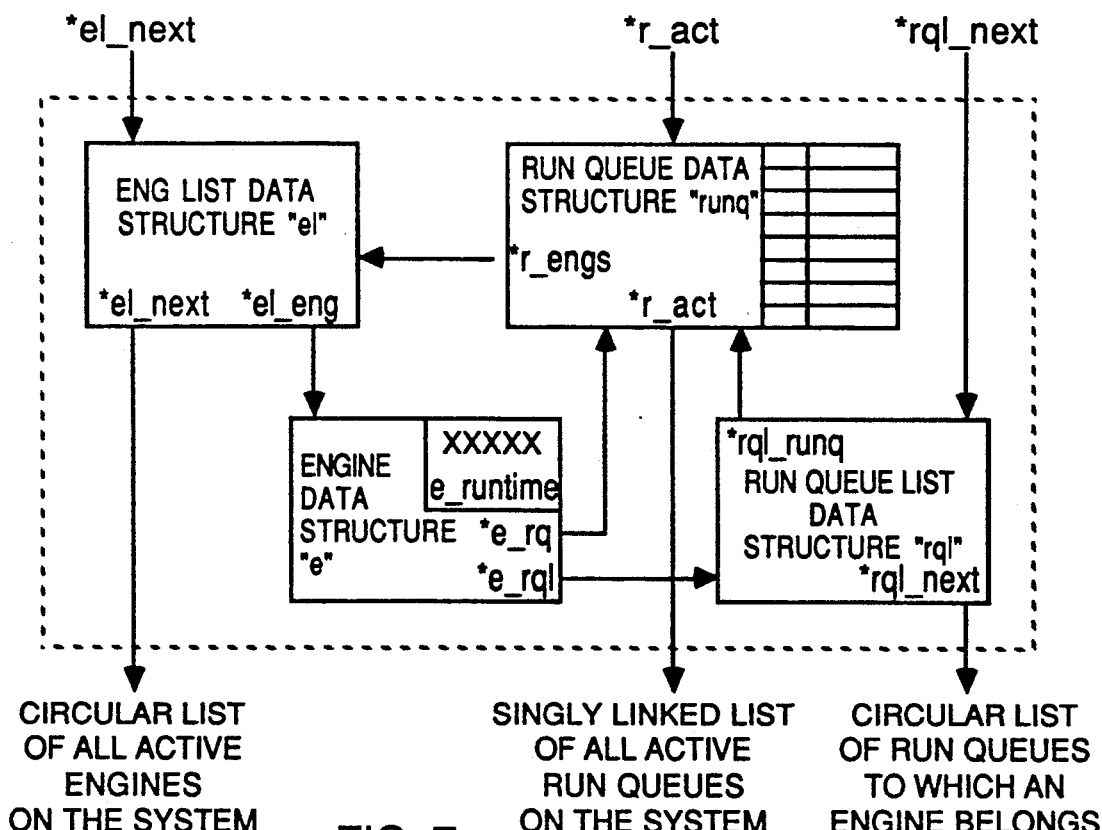
FIG. 7 illustrates relationships among data structures according to the present invention.
Figure 8:
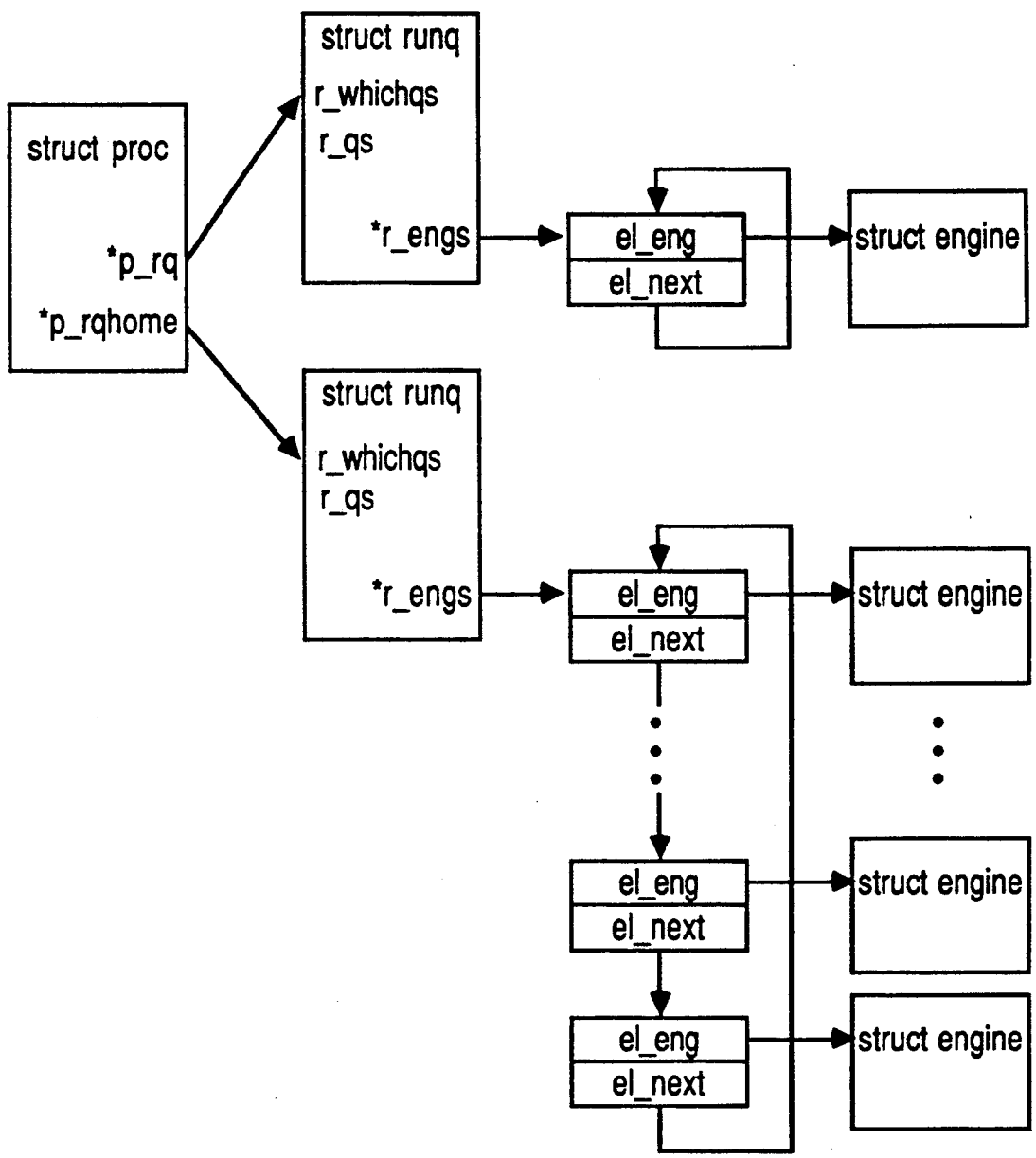
FIG. 8 illustrates relationships among data structures of the present invention from the perspective of the process data structure.
Figure 9:
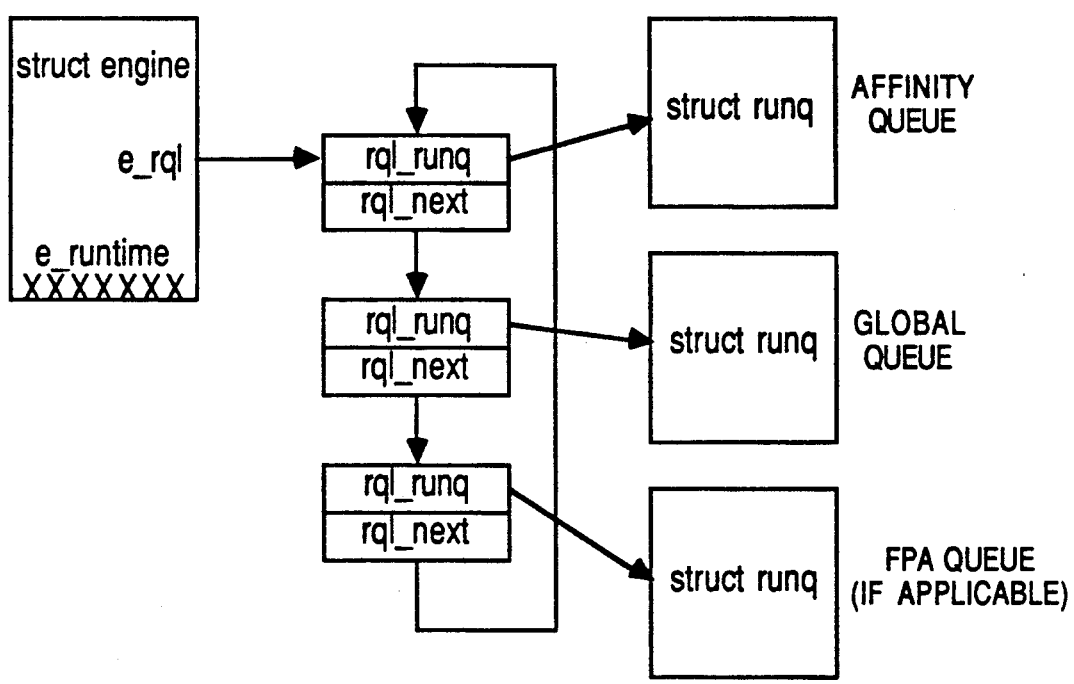
FIG. 9 illustrates relationships among data structures of the present invention from the perspective of the engine data structure.

FIGS. 7, 8, and 9 illustrates relationships among various data structures according to the present invention. FIG. 7 illustrates only a single engine list and a single run queue list, whereas, there are actually multiple lists of engines and multiple lists of run queues. FIG. 8 illustrates relationships among data structures of the present invention from the perspective of the process data structure, for a single process. FIG. 9 illustrates relationships among data structures of the present invention from the perspective of the engine data structure, for a single engine.

Pseudo-code for algorithms

The following is a description of the algorithms that govern the operation and relationship of processes, run queues, engines, and lists according to the present invention. The algorithms are expressed in pseudo-code format below. Multi-processor system 50 may use any conventional means to perform the functions of the algorithms, which are described below in detail.

1. Set process runnable (setrun/setrq)

The following algorithm is called setrun/setrq:
If process allows cache affinity
    calc_affinity.
Insert process in r_qs, update r_whichqs.
Find lowest priority engine in run queue.
If it is lower than the process
    Nudge the engine.

When it is newly created, or has awakened from a sleeping state, a process is set runnable by the above setrun/setrq algorithm. The run queue in which the process will be placed is a function of whether it ever ran before, where it may have run before, and the calculated amount of cache context for the process. The scan for the lowest-priority engine traverses the *r_engs list from the run queue data structure. If the process is attached to an affinity global run queue, then the lowest priority engine is the only engine associated with an affinity run queue.

2. Calculate cache affinity (calc_affinity)

The calculation of cache affinity (i.e., the calc_affinity of the setrun/setrq algorithm) of a newly runnable process is described in the pseudo-code routine below. The following algorithm is called calc_affinity:

If process never ran
    return
If process is currently on affinity run queue
    If no cache warmth or shutdown
        Leave the affinity run queue.
Else
    If cache warmth and not shutdown
        Join the affinity run queue.

This pseudo-code represents the basic process for utilizing cache affinity: if the process has cache warmth, attach the process to the affinity run queue; if the cache is cold, attach the process to its home run queue. The exact number of clock ticks for "cold" and "warm" cache values are patchable parameters, to allow implementation specific applications. A value of $D_{e-p}$ less than a lower limit $L_{lower}$ indicates a warm cache. A value of $D_{e-p}$ greater than an upper limit $L_{upper}$ indicates a cold cache. In a preferred embodiment, $L_{lower}$ and $L_{upper}=15$.

If the value of $D_{e-p}$ is between $L_{lower}$ and $L_{upper}$, the scheduler considers the current state of run queue pointer *p_rq in deciding in which run queue to enqueue a process. As described above, if a process is affinitied to an engine, *p_rq points to the affinity run queue of that engine. If the process is not affinitied, then *p_rq points to the home run queue, which is typically global run queue 54. In essence, the algorithm states, if a process is not affinitied, then the run queue to which *p_rq points will not change unless the cache context is high. If a process is affinitied, then the run queue to which *p_rq points will not change unless the cache context is low. The gap between $L_{lower}$ and $L_{upper}$ thus builds hysteresis into the run queue switching algorithm and prevents pointer oscillations.

The hysteresis scheme is summarized in the table, below:

| $D_{e-p}$ | *p_rq | Run queue process enqueued to |
|---|---|---|
| $D_{e-p} < L_{lower}$ | global | affinity |
|  | affinity | affinity |
| $L_{lower} \leq D_{e-p} \leq L_{upper}$ | global | global |
|  | affinity | affinity |
| $D_{e-p} > L_{upper}$ | global | global |
|  | affinity | global |

As can be seen from the table, if $D_{e-p} < L_{lower}$, the process is enqueued to the affinity run queue of the engine (*p_runeng) on which the process last ran, regardless of whether *p_rq points to the affinity run queue or the global run queue. If $L_{lower} \leq D_{e-p} \leq L_{upper}$, then the process is enqueued to whatever run queue *p_rq points to. If $D_{e-p} > L_{upper}$, then the process is enqueued to the global run queue, regardless of whether *p_rq previously pointed to the affinity run queue or the global run queue. In the case where $D_{e-p} > L_{upper}$, if *p_rq previously pointed to the affinity run queue, *p_rq is changed to point to the global run queue.

The hysteresis scheme is illustrated by the following example. At time $t_0$, both *p_rq (current run queue pointer) and *p_rqhome (home run queue) of process X point to global run queue 54. At time $t_1$, process X is run by engine 1, and *p_rq points to engine 1. At time $t_2$, engine 1 stops running process X, which then goes to sleep. At time $t_2$, the count of the counter of engine number 1 is $C_1$, which is stored in memory as p_runtime. At time $t_3$, process X becomes runnable, and at time $t_4$, the scheduler decides whether to enqueue runnable process X to the affinity run queue 58 of engine 1 or to global run queue 54. At time $t_4$, the count of the counter of engine 1 is $C_1+5$, which is stored as e_runtime. Therefore, $D_{e-p}=(C_1+5)-C_1=5$. As noted above, in a preferred embodiment, the $L_{lower}=3$ and $L_{upper}=15$. Because, $L_{lower} \leq 5 \leq L_{upper}$, *p_rq continues to point to the global run queue.

Continuing the example, at time $t_5$, process X is run by, for example, engine 5. Therefore, *p_rq points to engine 5. At time $t_6$, engine 5 stops running process X, which then goes to sleep. At time $t_6$, the count of the counter of engine number 5 is $C_2$, which is stored in memory as p_runtime. At time $t_7$, process X becomes runnable, and at time $t_8$, the scheduler decides whether to enqueue runnable process X to the affinity run queue 58 of engine 5 or to global run queue 54. At time $t_8$, the count of the counter of engine 1 is $C_2+2$, which is stored as e_runtime. Therefore, $D_{e-p}=(C_2+2)-C_2=2$.

Because, $D_{e-p}=2 < L_{lower}$, process X is enqueued to the affinity queue 58 of engine 5.

Then, the next time process X becomes runnable, the scheduler will decide whether process X should be enqueued to the affinity queue 58 of engine 5 or global run queue 54. However, because process X is affinitied to engine 5, $D_{e-p}$ must be greater than $L_{lower}=15$ in order for process X to be enqueued to global queue 54.

In a preferred embodiment, the calculation of $D_{e-p}$ is made before the decision of which run queue to place the process. There is some latency time between the time the decision of which run queue to place the process in and the time that the process is actually run on an engine. The cache context for that process may have eroded during the latency time. Therefore, the latency time should be considered in choosing the values for $L_{lower}$ and $L_{upper}$. The relatively low values assigned to $L_{lower}$ and $L_{upper}$ in the preferred embodiment compensate somewhat for cache context "cooling" during the latency time.

3. Switch to a new process (swtch)

The following algorithm is called swtch:
Record current engine, engine time in proc
Loop:
    If shutdown
        Shut down.
    Find highest priority process in run queue.
    If found something to do
        Run it.
    idle (returns runq)
    If idle found something
        Run it.
End loop.

The first step updates the p_runtime and *p_runeng fields. These are then used by the setrq() algorithm to implement cache affinity. The loop also calls a function to find the run queue containing the highest priority process under the engine's list. If a run queue with a runnable process is found, the next process from that run queue is dequeued and run. If a runnable process is not found, a subroutine, idle(), is called to implement idleness. Idle() also returns a run queue as idle() had this information available to it. This loop then takes the next process from this run queue, and runs it. Idle() can also detect that the idling engine has been requested to shutdown. In this case, idle() runs without a run queue. This causes swtch to go back to the top of its loop, detect that the engine has been requested to shutdown, and shut itself down.

4. Priority and load balance algorithms

In a multi-engine, multi-run queue system, there is a need to periodically assess and adjust the priority of processes and the engines on which those processes are queued to run on. The three major algorithms are: (1) timeslice(), which timeshares processes of equal priority within a particular run queue slot; (2) schedcpu(), which periodically adjusts the priority of processes assigned to different run queue slots in the same run queue; and (3) load_balance(), which periodically moves processes from one run queue to another to average the amount of work to be performed by each engine. The pseudo-code for these algorithms is given below.

a. Cause timeslicing (timeslice)

The following algorithm is called timeslice:

-continued a. Cause timeslicing (timeslice)

For each active run queue
    Find highest priority waiter.
    If higher than or equal to lowest priority
    engine, Nudge engine.

The timeslicing algorithm is unchanged from the one in the conventional UNIX scheduler. What has changed is the way in which the algorithm is applied to the affinity run queues, global run queue 54, and the FPA run queue. In the system code of prior art system 10, both the FPA and affinity run queues were special cases. In this invention, the same data structure (struct runq) is used for all types of run queues, thereby making it possible to generalize the code and run the same algorithm across each run queue on the active list. There is a possible problem when an engine is a member of more than one run queue. However, the e_npri field correctly indicates what priority is pending on that engine (via nudge), so each successive run queue, as it is timesliced, will treat the engine accordingly.

b Change process priority (schedcpu)

The schedcpu() algorithm is unchanged from the one used in the conventional UNIX schedulers.

c. Cause load balancing (load_balance())

The following algorithm is called load_balance:
Scan all on-line engines
    Record engine with lowest maxnrun value
    Record engine with highest maxnrun value.
If lowest is two less than highest
    Move (highest−lowest)/2 processes from
    highest to lowest.
Clear maxnrun value for all engines.

d. Calculate maxnrun

The following algorithm is called runq_maxnrun:
For each on-line engine
    Count how many processes are queued
    If engine is running add one to this count
    If count is greater than maxnrun for this
    engine
        Add 1/8 to maxnrun for this engine.

The maxnrun routine collects information about the overall process load of the various engines. The value of maxnrun is used in the load balance algorithm. By sampling the number of processes queued to each engine, the routine approximates how many processes are competing for each engine. By incrementing the maxnrun value in $\frac{1}{8}$th count intervals, the routine filters the value and prevents utilization spikes from adversely skewing the maxnrun value. maxnrun is sampled 10 times per second. The runq_maxnrun algorithm could delete the step of adding one to the count if an engine is running.

The load_balance routine runs every five seconds, which corresponds to 50 samples of the maxnrun value for each engine. The load_balance routine identifies significant load imbalances and then causes a fraction of the processes to move from the most loaded engine to the least loaded engine. Maxnrun is cleared after each sampling interval. When there are ties among the most loaded or least loaded engines, the load_balance routine operates on the first tie found. Round robin scanning is used to minimize "favoritism" on the part of the load balancing routine.

The advantage of the multi-run queue algorithm is that the scheduling code paths continue to be as short as they were in the prior art. The cache affinity decision is made once at the time the process becomes runnable, and there is no potential for the same process to be considered repeatedly as each engine looks for work. Because there are separate run queues, there is also the possibility of moving the run queue interlock into the run queue itself, thus allowing multiple engines to schedule and dispatch their workloads in parallel.

Alternative embodiments of the invention

It will be obvious to those having skill in the art that many changes may be made to the details of the above-described embodiment of this invention without departing from the underlying principles thereof.

For example, the invention is also applicable to multi-processor computing systems other than those using UNIX operating systems.

System 50 could include more than one type of engine, but only one global run queue. The global run queue could queue processes of more than one type, such as, for example, 386 type processes and FPA type processes.

The calculation of cache context can be made closer to the time that a process is actually run, for example, when there is only one process in front of the process in question.

The estimation of cache context may consider kernel processes as well as user processes. For example, the counter of an engine could be incremented when the hardclock routine is entered while an engine is running a kernel process.

In the preferred embodiment described above, the scheduler considers only the value of $D_{e-p}$ and whether the process is affinitied or unaffinitied in deciding whether a process should be enqueued to an affinity run queue or a global run queue. Alternatively, the scheduler could consider other factors such as the number and/or priority of processes in the affinity run queue. The scheduler could also consider how many processes there are in other run queues and how much data are expected to pass over system bus 12 in the next short time period.

In the preferred embodiment, there is one cache memory for each engine. Alternatively, an engine could have more than one cache memory or share a cache memory with one or more other engines.

In the preferred embodiment, the same data structure is used for each run queue. Alternatively, different data structures could be used for different types of run queues.

The preferred embodiment employs load_balance. Alternatively or in addition, an engine could "steal" work as follows. An idle engine could scan the affinity run queues of other engines for waiting processes that could be run on the idle engine. This could have the effect of the load_balance algorithm, but might achieve this effect with less latency. This technique could defeat the effects of cache affinity by causing many more engine-to-engine process switches than would occur otherwise. The cases where this technique can be used effectively are thus determined by the speed of the engines, the size of the caches, and the CPU utilization characteristics of the processes being scheduled.

The scope of the present invention should be determined only by the following claims.

I claim:

1. A computing system, comprising:

multiple computing engines that run processes, the multiple computing engines being associated with respective cache memories and respective affinity run queues;

cache context estimating means for estimating an amount of cache context of a particular one of the cache memories with respect to a particular one of the processes;

enqueuing means for enqueuing certain ones of the processes to the affinity run queues; and decision means responsive to the estimated amount of cache context for deciding whether to enqueue the particular process to a particular one of the affinity run queues.

2. The system of claim 1 in which the certain ones of the processes that are enqueued to the affinity run queues comprise a first set of processes, and the enqueuing means also enqueues a second set of processes to at least one global run queue, where some of the processes are included in both the first and second sets of processes, and in which the decision means decides whether the particular process is to be enqueued to the particular affinity run queue or to one of the global run queues.

3. The system of claim 2 in which each one of the affinity run queues and each one of the global run queues comprises an array of slots arranged in priority, each slot being capable of queuing a linked list of processes.

4. The system of claim 2 in which one of the affinity run queues and one of the global run queues have substantially identical data structure.

5. The system of claim 2 in which there are at least two global run queues and the processes include processes of a particular type, and one of the global run queues may enqueue processes of the particular type and another one of the global run queues may not.

6. The system of claim 1 in which the decision means considers whether the particular process is affinitied or unaffinitied in deciding whether to enqueue the particular process to the particular affinity run queue.

7. The system of claim 1 in which the cache context estimating means includes engine activity measuring means for counting engine activity time occurring from a time when the particular process leaves the particular computing engine to a later time.

8. The system of claim 7 in which the engine activity measuring means includes a counter that counts units of engine activity.

9. The system of claim 7 in which the later time is a time at which the decision means decides whether the particular process is to be queued to the particular affinity run queue.

10. The system of claim 7 in which the processes include user processes and kernel processes, and the engine activity measuring means counts engine activity time occurring during user processes, not during kernel processes.

11. The system of claim 1 in which the decision means is responsive to a number of processes queued to the particular affinity queue in deciding whether the particular process is to be queued to the particular affinity run queue.

12. The system of claim 1 in which the decision means is responsive to a priority of the particular processed queued to the particular affinity queue in deciding whether the particular process is to be queued to the particular affinity run queue.

13. The system of claim 1 in which the decision means is responsive to a number of processes enqueued to the affinity run queue of the particular computing engine and a number of processes enqueued to the affinity run queues of other ones of the computing engines.

14. The system of claim 1 in which the decision means is responsive to a number of the processes that are queued to ones of the affinity run queues other than the particular affinity run queue in deciding whether the particular process is to be queued to the particular affinity run queue.

15. The system of claim 1 in which the decision means is responsive to an anticipated amount of data passing on a system bus in deciding whether the particular process is to be queued to the particular affinity run queue.

16. The system of claim 1 in which the decision means decides whether the particular process is to be queued to the particular affinity run queue in response to the particular process being located in a predetermined section of the affinity run queue.

17. A computing system, comprising:
multiple computing engines that run processes, the multiple computing engines each being associated with a cache memory and an affinity run queue;

cache context estimating means for estimating with respect to a particular one of the processes an amount of cache context of the cache memory associated with a particular one of the multiple computing engines, which ran the particular process;

enqueuing means for enqueuing certain ones of the processes to the affinity run queues; and decision means responsive to the amount of cache context for deciding whether to enqueue the particular process to the affinity run queue associated with the particular computing engine.

18. A computing system, comprising:
multiple computing engines that run processes, the multiple computing engines each being associated with a respective cache memory, a respective affinity run queue, and at least one global run queue;

cache context estimating means for estimating an amount of cache context of a particular one of the cache memories with respect to a particular one of the processes;

enqueuing means for enqueuing certain ones of the processes to the affinity run queues; and decision means responsive to the amount of cache context for deciding whether to enqueue the particular process to the affinity run queue associated with the particular computing engine or to one of the global run queues.

19. A computing system, comprising:
multiple computing engines that run processes including unaffinitied processes and affinitied processes, the multiple computing engines being associated with respective cache memories, respective affinity run queues, and at least one global run queue;

cache context estimating means for estimating an amount of cache context of a particular one of the cache memories with respect to a particular one of the processes;

enqueuing means for enqueuing certain ones of the processes to the affinity run queues; and decision means responsive to the estimated amount of cache context for deciding whether a particular unaffinitied process should become affinitied to a particular one of the computing engines and enqueued to the affinity run queue of the particular computing engine, and for deciding whether a particular affinitied process should become unaffinitied and enqueued to one of the global run queues.

20. A computing system, comprising:

multiple computing engines that run processes and are associated with respective affinity run queues, respective particular numbers of the processes being associated with each computing engine, the respective particular numbers being at least zero;

storage means for storing multiple variables each having a value and each respectively associated with the multiple computing engines, each respective particular number corresponding to one of the variables;

sampling means for repeatedly sampling the respective particular numbers of the processes associated with each computing engine;

determining means for determining which of the respective particular numbers of processes are greater than the corresponding variable values;

increasing means for increasing each one of the variable values for which a corresponding respective particular number is determined to be greater; and moving means for transferring certain ones of the processes from one of the affinity run queues associated with one of the computing engines associated with a highest variable value to one of the affinity run queues associated with one of the computing engines associated with a lowest variable value.

21. The system of claim 20 in which each one of the respective particular number of the processes is an integer equal to a number of the processes in the affinity run queue of the respective computing engine plus one if one of the processes is being run by the respective computing engine when a sample is made.

22. A method for assigning processes to run queues in a multi-engine computing system, the method comprising the steps of:

queuing a process to a global run queue;

running the process on a first computing engine which is associated with a first cache memory;

storing the process in a memory;

storing a first count of a counter associated with the first computing engine at a time that the process is stored;

storing a second count of the counter at a time that the process becomes runnable;

comparing the first and second counts to estimate the amount of cache context remaining in the first cache memory with respect to the process; and deciding whether to enqueue the process to an affinity run queue associated with the first computing engine or to another run queue based on the estimated amount of cache context.

23. The system of claim 21 further comprising priority considering means for considering a priority of one of the processes in determining whether the process should be transferred.

24. A computing system, comprising:

multiple computing engines that run processes and are associated with respective affinity run queues, respective particular numbers of the processes being associated with each computing engine, the respective particular numbers being at least zero;

storage means for storing multiple variables each having a value and each respectively associated with one of the multiple computing engines, each respective particular number corresponding to one of the variables;

determining means for determining which of the respective particular numbers of processes are greater than the corresponding variable values;

increasing means for increasing each one of the variable values for which a corresponding respective particular number is determined to be greater; and moving means for transferring certain ones of the processes from one of the affinity run queues associated with one of the computing engines having a particular variable value to another one of the affinity run queues associated with one of the computing engines associated with a lower variable value.

25. The system of claim 24 further comprising priority considering means for considering a priority of one of the processes in determining whether the process should be transferred.

* * * * *

UNITED STATES PATENT AND TRADEMARK OFFICE
CERTIFICATE OF CORRECTION

PATENT NO.  : 5,185,861                                    Page 1 of 2

DATED       : February 9, 1993

INVENTOR(S) : Andrew J. Valencia

It is certified that error appears in the above-identified patent and that said Letters Patent is hereby corrected as shown below:

Column 1, line 6, change "multiprocessor" to --multi-processor--.

Column 1, line 64, change "m =n" to --m = n--.

Column 2, line 3, change "4" to --34--.

Column 3, line 10, change "realworld" to --real-world--.

Column 3, line 55, change "$12_{12}$" to --$12_p$--.

Column 8, line 13, change "at time $t\_D_{e-p}$" to --at time $t\ \ \ D_{e-p}$--.

Column 9, line 27, change "(e.g., less" to --(e.g. less--.

Column 12, line 67, after "$L_{lower}$" insert --= 3--.

Column 15, line 47, change "load balance" to --load_balance--.

UNITED STATES PATENT AND TRADEMARK OFFICE
CERTIFICATE OF CORRECTION

PATENT NO. : 5,185,861
DATED : February 9, 1993
INVENTOR(S) : Andrew J. Valencia It is certified that error appears in the above-indentified patent and that said Letters Patent is hereby corrected as shown below:

Column 17, line 65, change "processed" to --processes--.

Signed and Sealed this

Eleventh Day of January, 1994

Attest:

BRUCE LEHMAN

*Attesting Officer*  *Commissioner of Patents and Trademarks*